United States Patent [19]
Pickens

[11] Patent Number: 4,581,494
[45] Date of Patent: Apr. 8, 1986

[54] TELEPHONE INTERFACE-TEST DEVICE

[75] Inventor: Herman L. Pickens, Huntsville, Ala.

[73] Assignee: James A. Mayberry, Birmingham, Ala.

[21] Appl. No.: 658,813

[22] Filed: Oct. 9, 1984

[51] Int. Cl.$^4$ .............................................. H04B 3/46
[52] U.S. Cl. .................. 179/175.3 R; 179/175.3 F
[58] Field of Search ................ 179/175.3 R, 175.3 F, 179/175.2 C, 81 R, 81 C, 99 LC; 324/133

[56]  References Cited
U.S. PATENT DOCUMENTS 3,976,849  8/1976  Champan ................. 179/175.3 R X
4,388,501  6/1983  Ahuja ............................ 179/175.3 R
4,513,176  4/1985  Fostveit ................... 179/175.3 R X Primary Examiner—Stafford D. Schreyer
Attorney, Agent, or Firm—C. A. Phillips

[57]  ABSTRACT

A telephone-telephone line tester wherein a telephone line serving a user is selectively coupled and uncoupled to either or both an audio amplifier or a user's telephone circuit whereby telephone user difficulties may be readily determined as between the telephone line or user's circuit and equipment.

6 Claims, 1 Drawing Figure

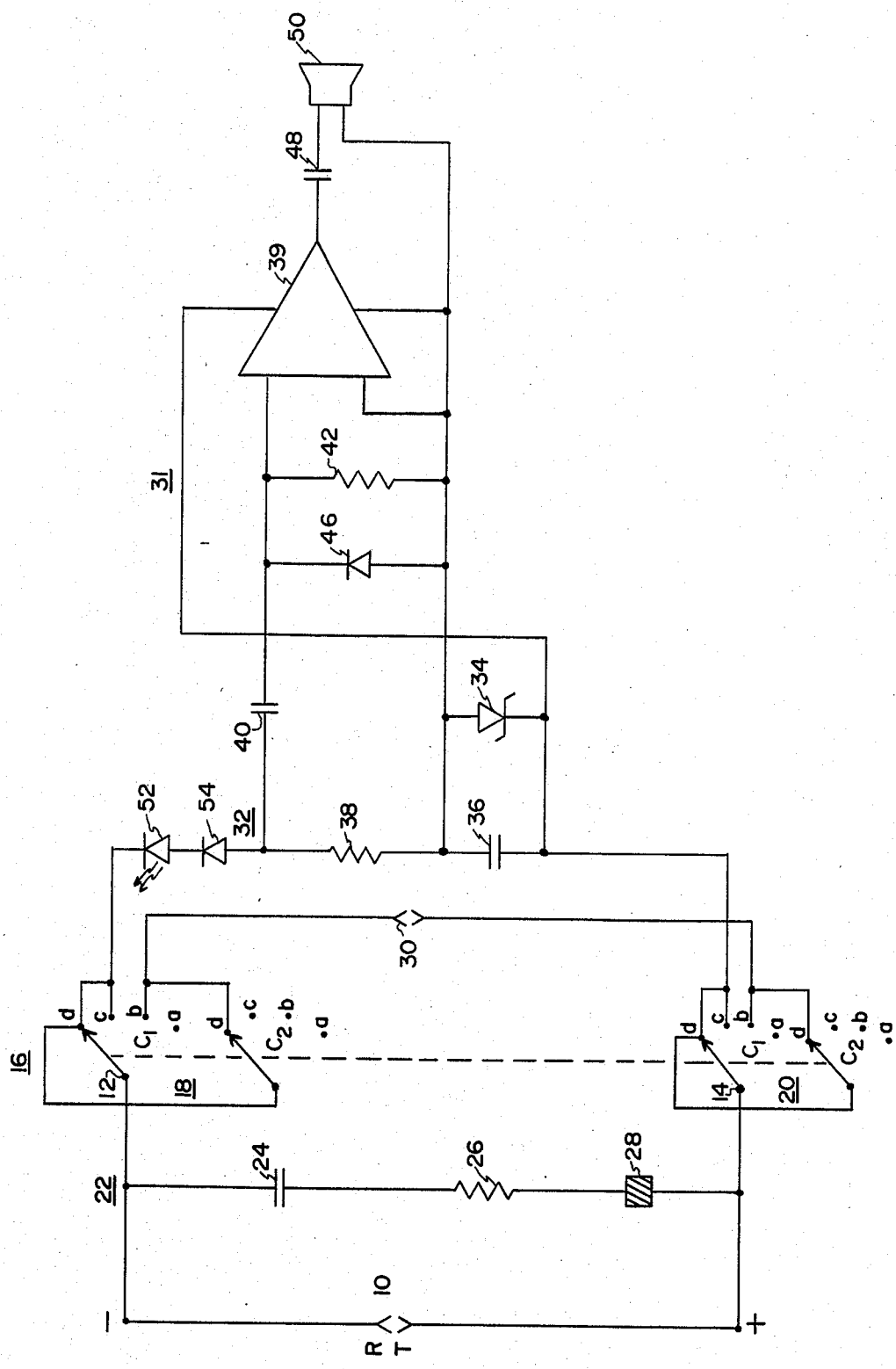

4,581,494

TELEPHONE INTERFACE-TEST DEVICE

FIELD OF THE INVENTION

This invention relates generally to telephone circuit testing equipment and particularly to a device which enables a telephone user to determine whether faulty operation stems from the telephone company line or his own telephone or wiring.

BACKGROUND OF THE INVENTION

Until quite recently, telephone subscribers in this country have looked totally to their telephone company for service, whether the fault might be with the telephone equipment or lines outside of the subscriber's premises or the telephone equipment or wiring within his premises. Now, however, in most, if not all, areas a telephone company is only responsible for service up to one's premises and telephone wiring in one's premises, and telephones connected to it are the service responsibility of the subscriber. Unfortunately, when a telephone does not work, it is normally not readily apparent where the trouble lies. If when this occurs a subscriber calls the telephone company and they send out a service repairman and it is determined that the difficulty is not with the telephone company's equipment or lines, a subscriber may be required to pay a rather substantial amount for the call. It is therefore obvious that it would be highly desirable if there existed some relatively simple-to-operate test device which a telephone subscriber could use to determine whether a fault lies with his telephone or wiring or lies with telephone company lines or equipment.

It is, accordingly, an object of this invention to provide such a test device.

SUMMARY OF THE INVENTION

In accordance with this invention, the telephone line serviced by a telephone company would extend to and end at a test-interface device, and a user's telephone line plugs into it. The device includes a telephone termination impedance consisting of a capacitor, a resistor, and a varistor, whereby the telephone company may sample the condition of termination as a function of signals applied to the line. For example, with a ringing voltage applied, the varistor would change resistance from a high to a relatively low value and enable the telephone company to sense this change and thereby determine that the line is terminated and operable. Otherwise, the bias is transparent to normal audio signal levels. A double pole type of selector switch is included, having an input connected across the terminating impedance. This switch has at least two double pole outputs, a first of which is connected to a receptacle into which a user's telephone system is plugged, and the other or second of which is connected to the input of an audio amplifier. When the former is selected, normal telephone service is effected; and when the latter is selected, the switch connects the telephone line to the audio amplifier. The coupling circuitry includes an A.C. impedance and D.C. impedance across the telephone line. The D.C. impedance develops a bias voltage to power the audio amplifier, and the A.C. impedance accomplishes two things. One, together with the D.C. impedance, it presents a selected load to the telephone line which the telephone central office equipment recognizes as an acceptable load equivalent to taking a telephone off the hook and responsively applies a dial done to the line, and second, this A.C. impedance is coupled to the signal input of the audio amplifier, and the audiosignals of the amplifier are reproduced by a small speaker.

If, with the selector switch in a normal user position, the telephone is inoperative, one would operate the switch to the test position. Then, if a dial tone is heard, it is obviously clear that the difficulty being experienced is with the user's equipment and not that serviced by the telephone company.

As a further feature of this invention, switching means are provided for coupling the telephone line to both the user's outlet and audio amplifier. Thus, in this mode, a user may directly connect a telephone in the user's receptacle, bypassing telephone circuitry and determining whether or not service is restored. If it is, it is obvious then that the difficulty is in the house telephone circuitry.

BRIEF DESCRIPTION OF THE DRAWINGS

The single drawing in this case is an electrical schematic diagram of an embodiment of the invention.

DETAILED DESCRIPTION OF THE PREFERRED EMBODIMENT

Referring to the drawing, a circuit input is provided by modular jack 10 into which a telephone line from a central office would be plugged. The tip (or T) and ring (or R) inputs are polarized as shown to route the indicated D.C. polarities present on a telephone line to the input or movable contacts 12 and 14 of double pole, multiple throw switch 16. Switch 16 has separate switch sections 18 and 20 for the two poles, with each section having separate operating contact sets C1 and C2. A telephone line termination impedance 22 consisting of capacitor 24, resistor 26, and varistor 28 in series is connected across receptacle 24; and when a telephone line is plugged into it, there is presented to the telephone line effective noise filter and variable level impedance which may be used by the telephone company to assist it in examining its circuit input to a user. Varister 28 has a value which causes its resistance to change to a low value with a 3-volt peak-to-peak input to the line and to a high value when there is less than a 3-volt peak-to-peak input to the line.

Switch 16 has four output positions, A, B, C and D indicated by like identified contacts. In position A, the input line is switched to a no-connection position, and in this position, there is no coupling to the telephone line, and the telephone company may, from its telephone exchange or otherwise, check the line and determine operativeness in terms of indication of the presence of just the termination impedance 22. Switch positions B of contact sections C1 of switch sections 18 and 20 are connected across modular jack 30, and it functions to receive a telephone user's circuit or telephone which would be equipped with a mating modular plug. With a user circuit plugged into jack 30 and switch 16 in the B position, a normal connection would be made from a user's circuit to the telephone line. Accordingly, with both telephone line and user's equipment in operating condition, normal telephone service would be provided. Thus, switch position B is an operation or use position.

Switch position C is employed to couple the telephone line to amplifier 31, and coupling is effected through telephone line load circuit 32 connected between contact C of contacts C1 of switch section 18 and contact C of contacts C1 of switch section 20. Load impedance 32 basically has two sections in series, one being formed by 5- to 6-volt zener diode 34 and parallel connected filter capacitor 36, and a second being resistor 38. Keeping in mind that a standard telephone line, when properly operating, applies an essentially constant current supply source of approximately 20 milliamperes D.C., a D.C. bias is obtained across zener diode 34 and capacitor 36, and this is provided as an operating voltage to amplifier 31. Amplifier 31 includes an operational amplifier 39 connected as a single unit amplifier operating from this bias.

Resistor 38 functions as an impedance across which an A.C. signal is developed which drives amplifier 31 whenever an A.C. signal appears across the telephone line. The impedance of impedance 32 is such as to emulate an operating telephone, and thus with it being placed in circuit by C operating position of switch 16, the telephone exchange applies to the line an A.C. signal in the form of a dial tone or other signal. This is in addition to the D.C. on the line. These signals appear across resistor 38, are bypassed by capacitor 36, and are passed fed through capacitor 40 across resistor 42 between common terminal 44 and the non-inverting input of operational amplifier 39. Common terminal 34 also connects both to the inverting input and bias return of operational amplifier 39. Diode 46 is connected across the input of operational amplifier 39 and functions as a signal limiter.

The output of operational amplifier 39 is connected through capacitor 48 to one terminal of loud speaker 50, and the other terminal of loud speaker 50 is connected to common terminal 44. By this circuitry, the A.C. signals appearing across resistor 38 are amplified and reproduced by loud speaker 50.

In addition to an audible indication of the status of the input telephone line, a light emitting diode (LED) 52 is connected in series with impedance 32 connected across contacts C, and it provides a visual indication of the presence of a voltage on the input telephone line, indicating that it is D.C. active. Diode 54 connected in series with impedance 32 as a protective diode to prevent the inverse biasing, and damage of, LED 52 or zener diode 34, in case a mistake were made in connection with the telephone tip and ring sides of the telephone line to modular jack 10. Also, touch tone telephones are inoperable in the event of the reversal of the input telephone lines from a specified polarity. LED 52 will be illuminated by the D.C. on the telephone line whether or not an A.C. signal, a dial tone, is present or not. Thus, the LED provides a means of determining correct polarity for DTMF (dual tone multi-frequency) applications during installation.

Position D of switch 16 enables the direct testing of a telephone or in-house telephone circuit plugged into modular jack 36 while connected to a telephone line. In switch position D, contacts C and D of switch sections C1 of contacts C1 of both switch sections 18 and 20 are connected together, and thus amplifier 31 is operated and fed in the same manner as described above. In addition, however, contacts C2 of each switch section connects a contact B to contacts D and C, and thus both modular jack 30 and the input of amplifier 31 are connected across the telephone line. This thus tests both the combination of a telephone line and the telephone circuit plugged into modular jack 30 which may be either an in-house telephone wiring or a telephone.

Typically, the whole circuit is enclosed in a housing having an approximate dimension of 2.5" by 4" by 1.25", and it would be mounted on an interior wall of a building convenient to a telephone inlet line connector, typically known as a "protector."

In summary, applicant's device provide a single operative system which enables a complete sequence of testing and operation. First, with switch 16 in position A, a telephone company may make a direct test of its line apart from any user connected circuitry. Second, in the B position, a user's circuitry from his telephone to a telephone line is connected, enabling a normal telephone operation. Upon trouble occuring and the failure of the telephone service to his telephone on his telephone line, a user may switch to position C which tests the telephone line apart from his circuitry and equipment, this being done by the observation of a tone output of loud speaker 50 and/or light output of LED 52. The redundancy between these outputs is significant in that with both a dial tone and D.C. on the telephone line, both amplifier LED will indicate an output, whereas without a dial done but with D.C. on the line, loud speaker 50 will not respond but LED 52 will be illuminated. Thus, the user can inform the telephone company of this special condition. Finally, in position D, complete incircuit testing of the user's telephone circuit or his telephone may be effected as it is used with the telephone line and amplifier in circuit. Any inoperativeness as a particular telephone or in-house telephone circuit is plugged into jack 30 will particularly indicate the identity of a fault.

While it is to be noted that the combination achieved by switch function D employs two additional pole switching positions on switch 16, these latter pole positions may be omitted and a separate switch employed to effect the parallel connection of amplifier 31 with jack 30.

From the foregoing, it is to be appreciated that applicant has provided a simple but effective testing device which will enable a telephone subscriber to accurately determine whether the loss of telephone service is in telephone company lines or lies within his circuitry or telephone equipment. Further, it enables a user having several telephones to readily check them individually by plugging each in to modular jack 30.

What is claimed is:

1. A telephone line tester comprising:
   switching means having a double poled input adapted to be coupled to a telephone central office line and at least first and second double pole outputs for selectively coupling the double pole input to one of said double pole outputs;
   a plug jack coupled across said first output, and said plug jack having receptacle means for receiving an electrical plug having at least first and second electrical conductors, whereby a telephone user circuit may be coupled and uncoupled to said electrical conductors;
   electrical circuit means connected across said second output and said circuit means including a constant voltage impedance and signal impedance connected in series and an illuminating impedance for effecting and fully powering the turn-on of a dial tone on said telephone line when connected to said telephone line;
   amplification means including a bias input connected across said constant voltage impedance, a signal input connected across said signal impedance for amplifying dial tone signals across said signal impedance; and a signal-to-sound reproducer connected across said output of said amplification means;

whereby, with said switching means in a first said position, said jack provides coupling between any user telephone circuit connected to a telephone central office line enabling telephone service, and when said switching means is in said second position, said amplification means is powered and a dial tone on said telephone line is caused to appear on said telephone line and reproduced, and said illuminating impedance is illuminated without application of other operating bias.

2. A telephone line tester set forth in claim 1 further wherein said switching means includes means for selectively coupling both said jack and circuit means to said central office line.

3. A telephone line tester as set forth in claim 2 wherein said switching means further includes a fourth means for selectably disconnecting said jack and said circuit means from said input.

4. A telephone line tester as set forth in claim 3 wherein said illuminating impedance comprises a light emitting diode in series with said constant voltage impedance and signal impedance.

5. A telephone line tester as set forth in claim 4 including a capacitor across said constant voltage impedance.

6. A telephone line tester as set forth in claim 5 wherein a diode and resistor are connected across the signal input of said amplification means and a capacitor couples the signal appearing across said signal impedance to said signal input of said amplification means.

* * * * *

UNITED STATES PATENT AND TRADEMARK OFFICE
CERTIFICATE OF CORRECTION

PATENT NO. : 4,581,494

DATED : April 8, 1986

INVENTOR(S) : Herman L. Pickens

It is certified that error appears in the above-identified patent and that said Letters Patent is hereby corrected as shown below:

On the title page assignee should read

--(73) Assignees: James A. Mayberry, Birmingham, Alabama; Herman L. Pickens, Huntsville, Alabama and William E. Cooley, Arab, Alabama --.

Signed and Sealed this

Seventeenth Day of February, 1987

Attest:

DONALD J. QUIGG

Attesting Officer

Commissioner of Patents and Trademarks